(12) United States Patent
Herberth

(10) Patent No.: US 6,938,111 B2
(45) Date of Patent: Aug. 30, 2005

(54) METHOD FOR OPERATING AUTOMATION CONTROL EQUIPMENT APPLICATIONS

(75) Inventor: Harald Herberth, Oberasbach (DE)

(73) Assignee: Siemens Aktiengesellschaft, Munich (DE)

( * ) Notice: Subject to any disclaimer, the term of this patent is extended or adjusted under 35 U.S.C. 154(b) by 567 days.

(21) Appl. No.: 10/125,917

(22) Filed: Apr. 19, 2002

(65) Prior Publication Data

US 2003/0199998 A1 Oct. 23, 2003

(51) Int. Cl.$^7$ .......................... G06F 13/42; G06F 13/36
(52) U.S. Cl. ....................... 710/104; 710/311; 710/262; 710/52; 710/48
(58) Field of Search ........................... 710/1, 8, 48, 52, 710/260; 709/100, 318; 711/163; 700/3, 18, 19, 2; 364/134; 365/230.05

(56) References Cited

U.S. PATENT DOCUMENTS

| | | | | |
|---|---|---|---|---|
| 5,227,783 A | * | 7/1993 | Shaw et al. ............ | 340/870.19 |
| 5,335,199 A | * | 8/1994 | Aoyama ................ | 365/230.05 |
| 5,367,658 A | * | 11/1994 | Spear et al. .............. | 711/163 |
| 5,875,342 A | * | 2/1999 | Temple ...................... | 710/260 |
| RE36,263 E | * | 8/1999 | Janke et al. ................ | 364/134 |
| 5,978,593 A | * | 11/1999 | Sexton .......................... | 710/1 |
| 6,021,356 A | * | 2/2000 | Chang ........................... | 700/3 |
| 6,154,680 A | * | 11/2000 | White et al. .................. | 700/19 |
| 6,298,393 B1 | * | 10/2001 | Hopsecger ..................... | 710/8 |
| 6,412,032 B1 | * | 6/2002 | Neet et al. ..................... | 710/52 |
| 6,622,185 B1 | * | 9/2003 | Johnson et al. ............... | 710/48 |
| 6,675,070 B2 | * | 1/2004 | Lapham ........................ | 700/245 |
| 6,826,432 B2 | * | 11/2004 | Beck et al. ................... | 700/18 |
| 2003/0046324 A1 | * | 3/2003 | Suzuki et al. ................ | 709/100 |
| 2003/0177280 A1 | * | 9/2003 | Webster et al. .............. | 709/318 |

FOREIGN PATENT DOCUMENTS

EP 1 132 820 A2 * 12/2001 ........... G06F/13/16

* cited by examiner

*Primary Examiner*—Glenn A. Auve
*Assistant Examiner*—Christopher E. Lee
(74) *Attorney, Agent, or Firm*—White & Case LLP

(57) ABSTRACT

A method for operating automation control equipment applications ensures uninterrupted execution of a control application, at least during specific time periods, but such that the control application does not have the access privileges of a device driver. The operating system is configured for preventing calling of the processor commands from the control application, the processor communicating with the controlled automation equipment via a programmable bus interface. An embodiment of the method comprises the steps of performing read and write access of the control application to the bus interface directly and without routines of the operating system or device driver, and suspending processing of hardware interrupt calls of the processor during a preselected time period. Read and write access of the control application to the bus interface is thus carried out directly, rather than via routines of the operating system, and hardware interrupt calls of the processor are not processed during specific time periods.

25 Claims, 2 Drawing Sheets

METHOD FOR OPERATING AUTOMATION CONTROL EQUIPMENT APPLICATIONS

FIELD OF THE INVENTION

The present invention relates to a method for operating a control application for automation equipment having a control unit that has at least one processor running under an operating system.

BACKGROUND

Automation equipment has, in recent times, changed not only many industrial sectors but also a number of aspects of daily life. The significance of the changes extends from office equipment, to the processing and manufacturing industries, to logistics and building technology. The term "automation equipment" encompasses complex decentralized peripherals (I/O modules, measuring transducers, drives, valves, operator terminals and the like), as well as relatively simple actuators and sensors with binary signal systems.

The benefit that these types of automation equipment provide is determined in part by their ability to communicate with other pieces of equipment. It is usually necessary to connect the pieces of equipment to one another by means of bus systems. In this context, it has proven useful to control the data traffic on the bus by means of one or more units, referred to as master units. In contrast, other units, referred to as slave units, do not themselves have authorization to access the bus, but rather only output received data or transfer registered data to the master when requested by a master unit. These slave units can therefore also be referred to as "passive stations" (in contrast to "active" master units).

In the field of automation technology, programmable logic controllers (PLCs) are used primarily for processing data. Within the bus system, they often also assume the functionality of the master, either directly or in conjunction with specific assemblies. A PLC then carries out a control application for the automation equipment and also controls the necessary data traffic on the bus system. However, as a result of the rapid spread of generalized computing equipment, it is often advantageous to make it possible to use commercially available, general purpose computers, such as personal computers (PCs). In this way, not only is it often possible to use existing hardware at the same time for a number of tasks, but, when it is necessary to acquire new equipment, it is possible to profit from the favorable cost/benefit ratio of standard hardware. At the same time, it is possible to integrate the execution of a number of tasks (for example control, operation, monitoring and diagnostics) in one device, which can lead to additional cost savings. Finally, in this way it is also possible to achieve greater functional flexibility because the associated control applications can usually be programmed and reconfigured more easily in a typical PC environment.

Communication between the processor of a control unit and individual pieces of automation equipment usually occurs via a bus interface that transmits individual data packets over the bus system to the automation equipment and that can detect and read incoming data packets. For security reasons, the bus interface is generally programmed in such a way that, in an emergency, it independently places the data traffic on the bus system in a secure state. This is accomplished by placing the individual pieces of automation equipment in a non-hazardous basic state and by terminating communication with these pieces of automation equipment. Such security switching is necessary for two reasons.

First, the network of automation equipment must be kept from entering an uncontrolled state in the event of a failure of the control unit. In order to detect such an emergency, a watchdog mechanism is usually provided: an emergency is always assumed to have occurred as soon as the processor fails to transmit a signal to the bus interface during the course of a preselected period (typically a few seconds).

Second, it is typically necessary to have an additional protection mechanism that is sensitive and that acts even during a significantly shorter time period. The bus interface monitors for a signal, imposed by the processor, inhibiting access by the bus interface. Because the bus interface is generally forced by the protocol on the bus to transmit and receive data very quickly when required, it is also necessary to monitor effectively for signals, such as the inhibit signal described above, within a time frame of a few microseconds. If there is a relatively long inhibit imposed on the data access, delays on the bus system can lead to protocol errors that, in turn, can lead to data losses and should therefore be avoided.

The inhibiting of the data access described above occurs, in particular, in the context of a commonly-occurring and comparatively simple computer architecture that is commonly found and that serves to transfer data from the processor to the bus interface. In particular, there may be a memory module between the processor of the control unit and the bus interface. The memory module, which can be a multi-port storage device, can be written to and read from (e.g., dual port RAM) both by the processor and by the bus interface, and serves to transfer orders to the bus interface, as well as data packets that are to be transmitted to the pieces of automation equipment. The transfer from the control unit to the bus interface can be carried out by means of the following three steps:

1. The processor inhibits the bus interface;
2. The processor changes the data n the memory module that can be accessed on two sides; and
3. The processor releases the interface.

For the reasons described above, fatal errors may occur if the phase for which the bus interface is inhibited lasts longer than a few microseconds. However, this is the case particularly if an interrupt in the program execution occurs during the steps 1–3, and the program does not continue to step 3 until after another routine has been executed.

Such interrupts, though, are quite common in modern operating systems, especially in operating systems that support multitasking. In such systems, it is possible to conceive of different scenarios in which there may be a "controlled" program interrupt, that is to say one that is desired by the architect of the operating system. In the case of operating systems that are capable of multitasking, the available working time of the processor is distributed among the various applications, and the processor of the data processing system changes from one application to another with a specific timing in accordance with an external timer. If the processor receives such a time signal during the execution of the control application of interest, its execution is interrupted and the processor transitions to processing a different application. The processor, however, can also be made to execute certain other tasks and to interrupt the connection to the bus interface in response to other external events (for example the movement of the mouse cursor). Owing to the customary security switching, this leads to emergency securing of the data traffic on the data bus, and can thus lead to complete deactivation of the entire system, in particular during the data transfer operation (the three steps described above).

The possibilities for the interruption of a specific application described above result from a principle that underlies modern operating systems: In such systems the individual applications are generally not given authorization to access specific hardware components directly (user mode). In particular, the operating system prevents, at least temporarily, all processor commands from being called by the control application. This authorization is granted only to the operating system itself (kernel mode). In this way, not only is a protective barrier set up between the individual applications, which are executed in parallel, but it is also possible to prevent an erroneous program configuration of the individual application bringing about error states of the entire system that can no longer be corrected. In operating systems that have this protection mechanism, the individual applications lose the ability to react to current tasks in a guaranteed time interval. Nevertheless, as a result of the introduction of the kernel mode, it is no longer possible to predict the reaction times and processing times of an application. These operating systems are, therefore, also referred to as non-real-time-capable operating systems.

Expressed in abstract terms, the problems involved in the operation of a control application with a data processing system can be traced back to a conflict between two protection systems. In order to be able to actuate pieces of automation equipment reliably, it is necessary for contact to be maintained between the control application and the bus interface via the processor and for this contact not to be interrupted randomly. However, this contradicts a basic concept of modern operating systems that distinguishes between the user mode and the kernel mode and that does not allow a control application running in a user mode to have complete and permanent access to the processor.

Two concepts permit these problems to be avoided and the control application to bypass the protection scheme of the operating system in a particular case.

First, a number of what are referred to as generic device drivers are provided that permit an application to have direct access to the storage areas of the bus interfaces. This allows restrictions due to the operating system to be largely limited, though the problem of loss of control due to external events remains. As in the past, a control application can be interrupted by a change of application brought about by the operating system, or by the processing of an operating system routine.

Second, the control application itself can be programmed as a device driver. Device drivers control devices in a computer operating system and generally have extensive access privileges to all the devices of the operating system. In particular, device drivers can also inhibit the execution of hardware and software interrupts. As a result, such a control application is not subject to restrictions by the operating system, and direct access to the bus interface as a hardware component is ensured. The scope of the privileges of the application programmed as a device driver is preferably dimensioned in such a way that there is no decisive loss of security as a result of bypassing the security systems of the operating system. However, there may also be compensation for the loss of security by virtue of the fact that the number of applications running on the control unit is reduced. The disadvantages of this solution lie in the fact that device drivers can be configured in modern operating systems only at very high cost, which also requires extensive development, testing and maintenance measures. In addition, the calling of a device driver from an application takes a long time, which rules out this option for many applications.

SUMMARY OF THE INVENTION

An object of the invention is to provide a method of operating a control application in an operating system of the type described above. This control application is preferably as easy to program and maintain as possible, provided that uninterrupted execution of the control application is ensured, at least during specific time periods, although the control application does not have the access privileges of a device driver.

In order to achieve this and other objects, the present invention provides for a method of operating a control application for automation equipment having a control unit with at least one processor running under an operating system, the operating system configured for preventing calling of the processor commands from the control application, the processor communicating with the controlled automation equipment via a programmable bus interface. The method comprises the steps of performing read and write access of the control application to the bus interface directly and without routines of the operating system or device driver, and suspending processing of hardware interrupt calls of the processor during a preselected time period. In other words, read and write access of the control application to the bus interface is carried out directly and not via routines of the operating system, and hardware interrupt calls of the processor are not processed during specific time periods.

In accordance with an embodiment of the present invention, a method is provided for operating a control application for automation equipment having a control unit with at least one processor running under an operating system configured for preventing calling of the processor commands from the control application, the processor communicating with the controlled automation equipment via a programmable bus interface. The method comprises the steps of performing read and write access by the control application to the bus interface directly and suspending processing of hardware interrupt calls of the process during a preselected time period.

Another embodiment of the present invention is a system for controlling industrial process involving automation equipment, the system including a control unit with at least one processor running under an operating system configured for preventing calling of the processor commands from the control application. The processor communicates with the controlled automation equipment via a programmable bus interface and is programmed to perform read and write access by the control application to the bus interface directly, and to suspend processing of hardware interrupt calls of the process during a preselected time period.

Still another embodiment of the present invention involves a memory for storing data for access by a control application for automation equipment operating on a control unit with at least one processor running under an operating system, the operating system being configured for preventing calling of the processor commands from the control application, and the processor communicating with the controlled automation equipment via a programmable bus interface. The memory according to the present invention comprises computer readable program code embodied therein for causing performance of read and write access by the control application to the bus interface directly and also comprises computer readable program code means embodied therein for causing suspension of processing of hardware interrupt calls of the process during a preselected time period.

DETAILED DESCRIPTION OF THE INVENTION

Figure 1:
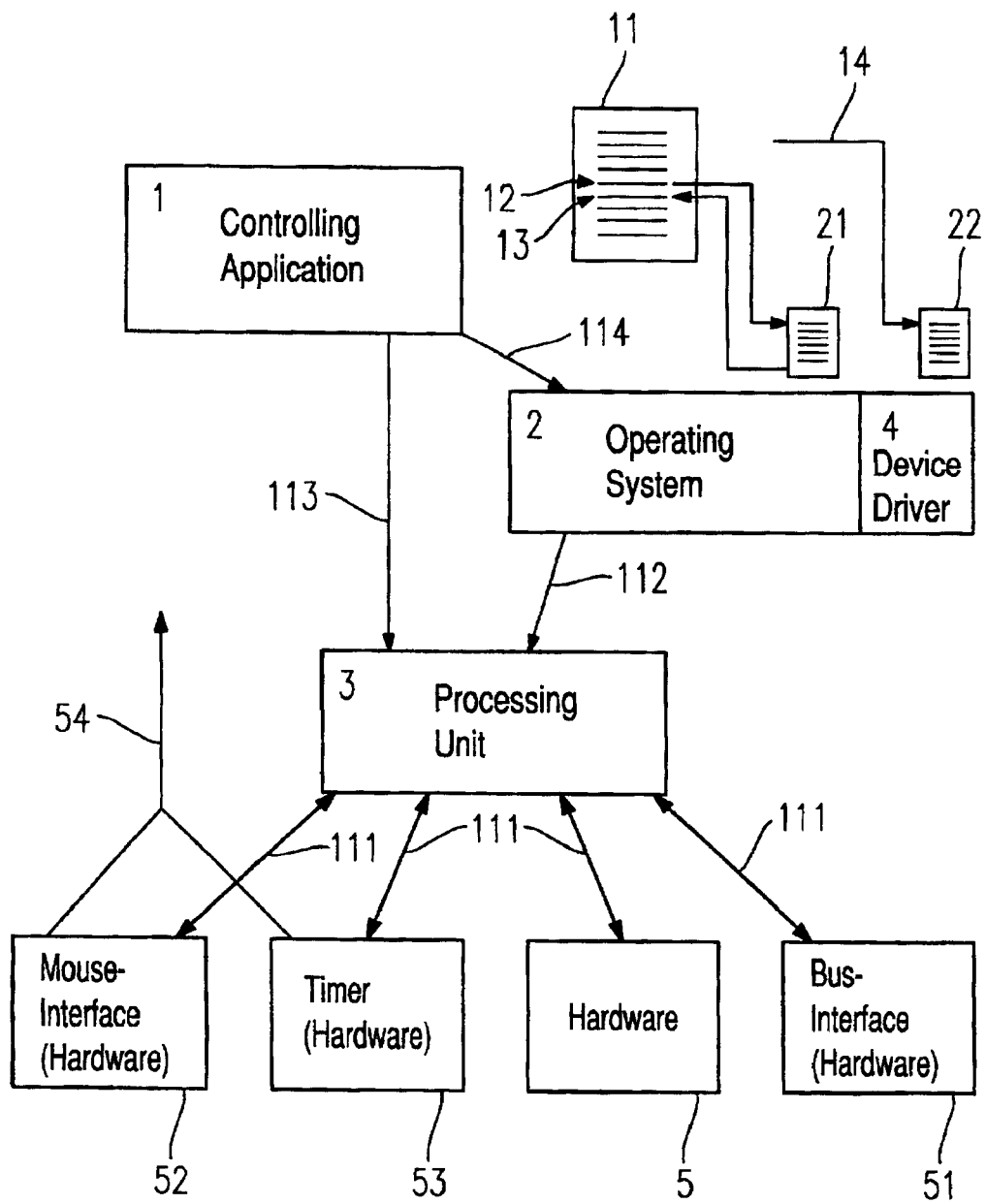
FIG. 1 shows in schematic form the structure of a data processing system on which the method according to the invention is applied.

As with any control application, a processor running the control application may access a respective bus interface. According to an aspect of the present invention, access by a control application to a bus interface should be performed directly, that is, only via routines of the processor, instead of selecting the path of programming as a device driver. This approach leads not only to increased processing speed (i.e., performance) but also facilitates the programming and maintenance of the application considerably. In addition, the security measures that are present in modern operating systems are largely preserved: The programmer of the control application operates only in what is referred to as the user mode, and the application, therefore, continues to be shielded, in particular by the protective barrier provided in the operating system, against error sources originating from other applications.

One restriction on the security measures described above arises as a result of hardware interrupt calls of the processor not being processed during specific time periods t1. Security programming of the bus interface therefore always intervenes as soon as its connection to the processor is interrupted for a specific time t. In addition to being caused by uncontrolled system crashes, such a connection interrupt should only occur then if a different application is processed on the processor of the control unit, or if the processor executes other specific system tasks. All of these possibilities are brought about by what are referred to as hardware interrupt calls. Hardware interrupt calls are electronic signals that are transmitted directly to the processor by hardware components (for example, mouse interface, printer, timer, etc.) and cause the processor to interrupt the deterministic processing of the active application. If these hardware interrupt calls are prohibited during the time t1, according to an aspect of the invention, it can therefore be ensured that the connection of the bus interface to the processor is not interrupted during this interval. The processor thus processes the control application reliably and permanently. According to an aspect of the present invention, a method provides for continuous contact between the control application and the bus interface that is ensured for specific time periods t1, during which the execution of the program is not interrupted. Which time periods t1 are selected for the inhibit interval depends on the requirements on the part of the actuated pieces of automation equipment and on the degree of processor time necessary for other tasks. At the same time, the control application can be programmed according to the invention as a "simple" application and not as a device driver.

The method according to the invention can also be applied on a control unit in which the processor and the bus interface can jointly read and write the contents of a storage means that is accessible on two sides, the access of the bus interface to the storage means being prevented while the processor changes the contents of the storage means. In these control units it is advantageous to refrain from processing the hardware interrupt calls of the processor at least during the interface access to the storage means when the method according to the invention is being executed. The time periods t1 that are selected in this way should advantageously comprise at least precisely this time period, but can also be selected to be larger. This embodiment is particularly advantageous because, as a rule, the protection mechanism of the bus interface is programmed to be particularly sensitive while the interface access is being prevented.

The method can be practiced with a processor that is compatible with Intel® x86 processors or other suitably configured processors In this case it is advantageous if the prevention of the hardware interrupt calls of the processor takes place in two steps:

a. During the initialization of the control application: setting of the I/O privilege level process parameter (IOPL in x86 or compatible processors) to the value 3 or analogous level in non-x86 or compatible processors.

b. During the program run: execution of the command CLI by the processor (also in x86 or compatible processors) or analogous command in non-x86 compatible processors.

In the operating systems mentioned above, a command is provided that prevents the processing of hardware interrupt calls. In an embodiment of the present invention, which may be implemented, for one example, using an Intel® X86 processor architecture, this command is referred to as "clear interrupt-enable flag" or CLI. CLI clears the interrupt flag if the current privilege level is at least as privileged as the IOPL. No other flags are affected. External interrupts are not recognized at the end of the CLI instruction or from that point on until the interrupt flag is set. General protection exception is signaled (#GP(0)) if the current privilege level is greater (has less privilege) than the IOPL in the flags register. IOPL specifies the least privileged level at which I/O can be performed.

Real Address Mode Exceptions
   None
Virtual 8086 Mode Exceptions
   #GP(0) as for Protected Mode This allows applications to bypass the system and work directly with the hardware.

In addition, Default settings are: IOPL=YES. As for Parameters, the value can be YES or NO or a list of specific programs. If set to NO, no programs can access the hardware directly. The list of programs that have direct access to hardware must contain only the executable name without the path and each program must be separated by a comma. See the examples below.

If program access directly to the hardware is to be prevented, this line is added to the config.sys file: IOPL= NO. If the programs prog1.exe and prog2.exe are to have direct hardware access, this line should be added: IOPL= PROG1.EXE, PROG2.EXE.

In alternative embodiments involving other microprocessors, analogous respective commands would be used. However, a CLI command is generally not accessible for applications operating in the user mode of the operating system. For this reason, according to this embodiment of the present invention, process parameter IOPL is set to the value 3 (or analogous setting in non-x86 compatible processors) during the initialization of the control application. As a result, the value CLI is also accessible for applications in the user mode. This embodiment permits the hardware interrupt calls to be conveniently prevented. As a result, hardware interrupt calls could, for example, be inhibited solely by using kernel mode commands. Instead, in this embodiment, an indirect procedure is proposed. By changing the process parameter IOPL in the kernel mode, the control application, which continues to run in the user mode, is privileged by virtue of the fact that it is provided with authorization to prevent the hardware interrupt calls.

In another embodiment of the method according to the present invention, the prevention of the hardware interrupt calls can ultimately be cancelled by executing the command "set interrupt-enable flag" or STI. STI sets an interrupt flag to 1. The x86 then responds to external interrupts after executing the next instruction, if the next instruction allows the interrupt flag to remain enabled. If external interrupts are disabled and code STI, RET are coded (such as at the end of a subroutine), the RET is allowed to execute before external interrupts are recognized. Also, if external interrupts are disabled and STI, CLI are coded, then external interrupts are not recognized because the CLI instruction clears the interrupt flag during its execution.

This is always desired if the permanent contact between the bus interface and processor is no longer necessary for a short time because, for example, other applications have to be executed for a short time. The command STI is also accessible to the control application running in the user mode after the parameter IOPL has been set to the value 3.

If a control unit were used in which the data and command transfer between the processor and bus interface takes place via a dual or multi-port storage means, command CLI can be executed by the processor at the start of the changing of the contents of the storage means. Consequently, command STI can be executed by the processor after the termination of the changing of the contents of the storage means.

In other embodiments, it is also possible for the command POPF to be used twice instead of the commands CLI and STI, as follows.

POPF/POPFD—Pop Stack into FLAGS or EFLAGS Register

| Opcode | Instruction | Clocks | Description |
| --- | --- | --- | --- |
| 9D | POPF | 5 | Pop top of stack FLAGS |
| 9D | POPFD | 5 | Pop top of stack into EFLAGS |

Operation: Flags:=Pop().

Description: POPF/POPFD pops the word or doubleword on the top of the stack and stores the value in the flags register. If the operand-size attribute of the instruction is 16 bits, then a word is popped and the value is stored in FLAGS. If the operand-size attribute is 32 bits, then a doubleword is popped and the value is stored in EFLAGS. Note that bits 16 and 17 of EFLAGS, called VM and RF, respectively, are not affected by POPF or POPFD.

The I/O privilege level is altered only when executing at privilege level 0. The interrupt flag is altered only when executing at a level at least as privileged as the I/O privilege level. (Real-address mode is equivalent to privilege level 0.) If a POPF instruction is executed with insufficient privilege, an exception does not occur, but the privileged bits do not change.

Flags Affected
All flags except VM and RF
Protected Mode Exceptions
SS(0) if the top of stack is not within the stack segment
Real Address Mode Exceptions
Interrupt 13 if any part of the operand would lie outside of the effective address space from 0 to 0FFFFH Virtual 8086 Mode Exceptions
GP(0) fault if IOPL is less than 3, to permit emulation The invention is explained in more detail below with reference to the appended FIGS. 1 and 2.

FIG. 1 shows the structure of a data processing system on which the method according to the invention is applied. Different hardware components 5, in particular a bus interface 51, a mouse interface 52 and a timer 53, are connected to a processor 3 via data and control lines 111. On the one hand, the operating system 2, with various device drivers 4, has access to the processor commands, but this is also the case for the controlling (or control) application 1 running on the data processing system. As a modern operating system 2, the latter prevents all the processor commands from being able to be called directly 113 by the control application, at least temporarily. This corresponds to a protection concept according to which a protective barrier is set up between individual applications that are executed in parallel. Faulty program configuration of the individual applications, therefore, does not lead to error states of the entire system that cannot be corrected. According to the method of the invention, the control application can, however, equally well gain read and write access to the bus interface 51 directly 113, 111. At the same time, in the kernel mode of the operating system 2, there is also the possibility of privileging the control application 1 by setting the process parameter IOPL. Reference numeral 11 refers to the command sequence of an application running on the data processing system, the operating system routine 21 being executed during a specific system call 12 and, after its termination, the execution of the program returning to the command step 13 of the command sequence 11. This deterministic command sequence between the user routines and operating system routines is interrupted in solutions known in the prior art as soon as what is referred to as a hardware interrupt call 54 is made by one of the connected hardware components 5, 51, 52, 53. This hardware interrupt call generally causes the data processing system to interrupt 14 the processing of the application and to process a specific operating system routine 22 related to the hardware interrupt call. In contrast to the routine call 12, presented above, by the application itself, this call 14 takes place, as it were, in an uncontrolled way and can influence the behavior of the processor in an unpredictable way from the point of view of the application. If the application provides, in particular, that continuous contact with a bus interface is necessary, this contact can be lost as a result. In contrast, the illustrated embodiment of the present invention provides that these operating system routines 22 are not processed during specific time periods t1. Uninterrupted execution of the program is thus ensured. This privileging of the control application 1 is always made possible by the processor command CLI if a guaranteed reaction time of the control application is required.

Figure 2:
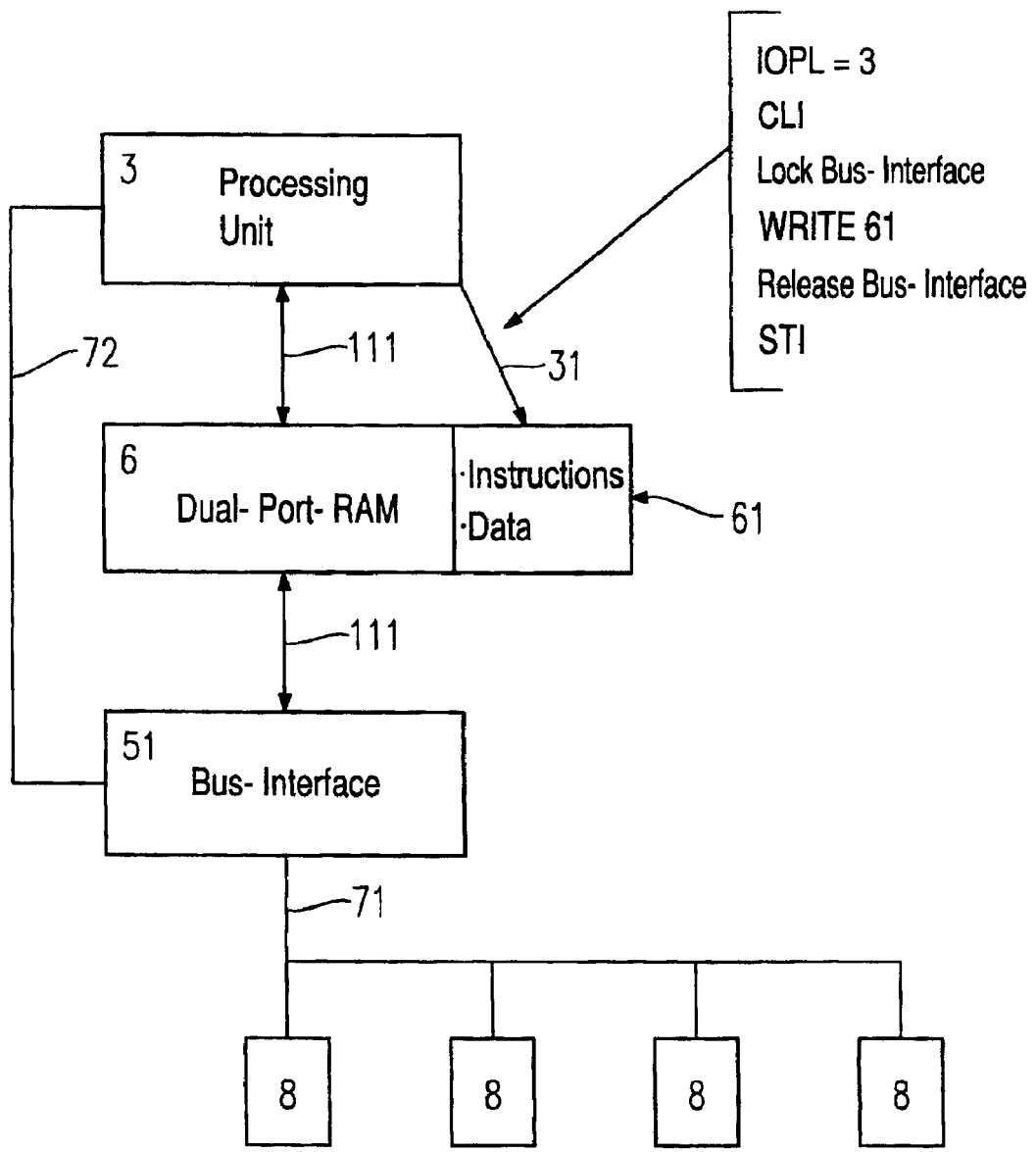
FIG. 2 shows a configuration of the processor and the bus interface of the control unit and the operation of a presently preferred embodiment of the method according to the present invention.

FIG. 2 shows the processor 3 of the control unit during the operation of a control application. The control unit also has a programmable bus interface 51, which has contact with the controlled pieces of automation equipment 8 via a bus system 71. The processor 3 and the bus interface 51 each have access to a storage means 6, which such as a dual port RAM, as shown, or more generally to a multi-port RAM (not shown). The processor 3 and bus interface 51 can jointly read and write to the memory 61 of the storage means and, in this way, exchange commands, instructions and data. The bus interface 51 is provided with a protection mechanism that monitors the connection to the processor 3 via the data line 72. As soon as this connection is interrupted for a specific time t, it places the individual pieces of automation equipment 8 in a non-hazardous basic state and terminates communication with them. While the processor changes the contents of the storage means 61, the access of bus interface 51 to the storage means 6 is prevented. Because the protection mechanism of the bus interface is particularly sensitive to connection interrupts in this time period, the command CLI is executed before the write operation 31, so that hardware interrupt calls cannot be carried out at this time. Immediately after the changing of the data and after the release of the bus interface, the command STI occurs and possibly occurring hardware interrupt calls are thus processed again. This illustrated inhibiting of hardware interrupt calls in the user mode with the processor commands CLI and STI can, however, only succeed if the control application has been previously privileged by setting the parameter IOPL to the value 3.

In addition to the embodiments of the aspects of the present invention described above, those of skill in the art will be able to arrive at a variety of other arrangements and steps which, if not explicitly described in this document, nevertheless embody the principles of the invention and fall within the scope of the appended claims. For example, the ordering of method steps is not necessarily fixed, but may be capable of being modified without departing from the scope and spirit of the present invention.

What is claimed is:

1. A method for operating a control application for automation equipment having a control unit with at least one processor running under an operating system, the operating system configured for preventing calling of the processor commands from the control application, the processor communicating with the controlled automation equipment via a programmable bus interface, the method comprising the steps of:
   performing read and write access by the control application to the bus interface directly; and
   suspending processing of hardware interrupt calls of the process during a preselected time period;
   wherein the control unit comprises a processor and bus interface adapted to read and write contents of a multi-port storage device, access of the bus interface to the storage device being prevented while the processor changes the contents of the storage device, and where hardware interrupt calls of the processor are not processed at least while access to the bus interface is prevented.

2. The method according to claim 1, wherein the prevention of the hardware interrupt calls of the processor comprises the steps of:
   during the initialization of the control application, setting an input/output privilege level to a sufficiently high level to take precedence over hardware interrupt calls to the processor; and
   during the program run, executing a command to clear an interrupt flag if the current input/output privilege level is at least as privileged as the set input/output privilege level.

3. The method according to claim 2 wherein the interrupt flag is cleared by the processor at the start of the changing of the contents of the storage device.

4. The method according to claim 3, wherein one command, selected from the group consisting of a command for setting an interrupt flag to the lowest privilege level and a command for popping data on top of a stack associated with the processor and storing the value in a flags register, is executed by the processor after the termination of the changing of the contents of the storage means.

5. The method according to claim 1, wherein the multi-port storage device comprises dual port random access memory.

6. The method according to claim 5, wherein the prevention of the hardware interrupt calls of the processor comprises the steps of:
   during the initialization of the control application, setting an input/output privilege level to a sufficiently high level to take precedence over hardware interrupt calls to the processor; and
   during the program run, executing a command to clear an interrupt flag if the current input/output privilege level is at least as privileged as the set level.

7. The method according to claim 6, wherein the interrupt flag is cleared by the processor at the start of the changing of the contents of the storage device.

8. A method for operating a control application for automation equipment having a control unit with at least one processor running under an operating system, the operating system configured for preventing calling of processor commands from the control application, the processor communicating with the controlled automation equipment via a programmable bus interface, the method comprising the steps of:
   performing read and write access by the control application to the bus interface directly; and
   suspending processing of hardware interrupt calls of the process during a preselected time period;
   wherein the control unit comprises an Intel® x86 compatible processor, and the prevention of the hardware interrupt calls of the processor comprises the steps of:
   during initialization of the control application, setting of process parameter IOPL (IO Privilege Level) to the value 3; and
   during a program run, executing command CLI.

9. The method according to claim 8, wherein the prevention of the hardware interrupt calls of the processor is cancelled by executing the command STI.

10. The method according to claim 9, wherein the prevention of the hardware interrupt calls of the processor is carried out in two steps:
    during the initialization of the control application, setting a process parameter IPL (IO Privilege Level) to the value 3; and
    during the program run, executing a POPF command.

11. The method according to claim 10, wherein the prevention of the hardware interrupt calls of the processor is cancelled by executing the command POPF.

12. The method according to claim 10, wherein one command selected from the group consisting of CLI and POPF is executed by the processor at the start of the changing of the contents of the storage means.

13. The method according to claim 10, wherein one command selected from the group consisting of the commands STI and POPF is executed by the processor after the termination of the changing of the contents of the storage means.

14. System for controlling an industrial process and associated automation equipment comprising:
    a control unit with at least one processor running under an operating system, the operating system configured for preventing calling of the processor commands from a control application, the processor communicating with the controlled automation equipment via a programmable bus interface;

the processor programmed to perform read and write access by the control application to the bus interface directly; and further programmed to suspend processing of hardware interrupt calls of the processor during a preselected time period;

wherein the control unit comprises a processor and bus interface adapted to read and write contents of a multi-port storage device, access of the bus interface to the storage device being prevented while the processor changes the contents of the storage device, and wherein hardware interrupt calls of the processor are not processed at least while access to the bus interface as prevented.

15. The system according to claim 14, wherein the processor is programmed to prevent hardware interrupt calls of the processor by setting, during the initialization of the control application, an input/output privilege level to a sufficiently high level to take precedence over hardware interrupt calls to the processor, and, during the program run, by executing a command to clear an interrupt flag if the current input/output privilege level is at least as privileged as the set input/output privilege level.

16. The system as claimed in claim 15, wherein processor is further programmed to clear the interrupt flag at the start of the changing of the contents of the storage device.

17. The system according to claim 16, wherein the processor is further programmed to execute a command, selected from the group consisting of a command for setting an interrupt flag to the lowest privilege level and a command for popping data on top of a stack associated with the processor and storing the value in a flags register, after the termination of the changing of the contents of the storage means.

18. The system according to claim 14, wherein the multi-port storage device comprises dual port random access memory.

19. The system according to claim 14, wherein the control unit comprises an Intel® x86 compatible processor.

20. A system for storing data for access by a control application for controlling automation equipment having a control unit with at least one processor running under an operating system, the operating system configured for preventing calling of the processor commands from the control application, the processor communicating with the controlled automation equipment via a programmable bus interface, the control unit comprising a processor and bus interface, the memory comprising:

computer readable program code embodied therein for causing performance of read and write access by the control application to the bus interface directly; and computer readable program code means embodied therein for causing suspension of processing of hardware interrupt calls of the process during a preselected time period; and computer readable program code for causing reading and writing of contents of a multi-port storage device, for preventing access by the bus to the storage device while the processor changes the contents of the storage device, and for preventing hardware interrupt calls of the processor at least during accessing of the bus interface.

21. The memory according to claim 20, wherein the memory further comprises computer readable program code for preventing prevent hardware interrupt calls of the processor by setting, during the initialization of the control application, an input/output privilege level to a sufficiently high level to take precedence over hardware interrupt calls to the processor, and, during the program run, by executing a command to clear an interrupt flag if the current input/output privilege level is at least as privileged as the set input/output privilege level.

22. The memory according to claim 21, further comprising computer readable program code for causing clearing of the interrupt flag at the start of the changing of the contents of liter of the storage device.

23. The memory according to claim 22, further comprising computer program code for causing execution of a command, selected from the group consisting of a command for setting an interrupt flag to the lowest privilege level and a command for popping data on top of a stack associated with the processor and storing the value in a flags register, after the termination of the changing of the storage means.

24. The memory according to claim 20, wherein the multi-port storage device comprises dual port random access memory.

25. The memory according to claim 20, wherein the control unit comprises an Intel® x86 compatible processor.

* * * * *